United States Patent
Greif et al.

(10) Patent No.: US 11,959,575 B2
(45) Date of Patent: Apr. 16, 2024

(54) ARRANGEMENT FOR RELEASING A COUPLING CONNECTION OF A HYDRAULIC QUICK COUPLER

(71) Applicant: DEERE & COMPANY, Moline, IL (US)

(72) Inventors: Felix P. Greif, Eberbach (DE); Martin Trinler, Hockenheim (DE); Andreas Zlaugotnis, Gundersweiler (DE)

(73) Assignee: DEERE & COMPANY, Moline, IL (US)

( * ) Notice: Subject to any disclaimer, the term of this patent is extended or adjusted under 35 U.S.C. 154(b) by 333 days.

(21) Appl. No.: 17/445,612

(22) Filed: Aug. 23, 2021

(65) Prior Publication Data

US 2022/0099226 A1 Mar. 31, 2022

(30) Foreign Application Priority Data

Sep. 29, 2020 (DE) .......................... 102020125415.6

(51) Int. Cl.
| | |
|---|---|
| *F16L 37/62* | (2006.01) |
| *F15B 1/04* | (2006.01) |
| *F15B 1/26* | (2006.01) |
| *F16L 37/23* | (2006.01) |

(52) U.S. Cl.
CPC ................ *F16L 37/62* (2013.01); *F15B 1/04* (2013.01); *F15B 1/26* (2013.01); *F15B 2201/40* (2013.01); *F16L 37/23* (2013.01)

(58) Field of Classification Search
CPC .................................. F16L 37/23; F16L 37/62
See application file for complete search history.

(56) References Cited

U.S. PATENT DOCUMENTS

| | | | |
|---|---|---|---|
| 5,655,983 A | 8/1997 | Dick | |
| 6,112,874 A | 9/2000 | Kopp et al. | |
| 6,776,187 B1 * | 8/2004 | Marquis | F16L 37/36 251/149.6 |
| 8,939,268 B2 | 1/2015 | Heubner | |
| 10,711,846 B2 * | 7/2020 | Severinsson | F16D 25/0638 |
| 2003/0010196 A1 | 1/2003 | Smith et al. | |
| 2006/0105883 A1 | 5/2006 | Krisher et al. | |
| 2011/0202232 A1 | 8/2011 | Busch et al. | |

(Continued)

FOREIGN PATENT DOCUMENTS

WO    WO 2020208480 A1    10/2020

OTHER PUBLICATIONS

European Search Report issued in European Patent Application No. 21195548.9, dated Mar. 14, 2022, 7 pages.

(Continued)

*Primary Examiner* — Thomas E Lazo

(57) ABSTRACT

An arrangement for releasing a coupling connection of a hydraulic quick coupler includes a hydraulic coupling for receiving a hydraulic plug. The hydraulic coupling has a coupler housing and a coupler cartridge displaceably mounted therein such that when the hydraulic plug is pushed in, the coupler cartridge adopts an operating position locking the hydraulic coupling. The arrangement also includes an actuating arrangement. The coupler cartridge is movable via the actuating arrangement from the operating position to an ejection position for releasing the hydraulic plug. The coupler cartridge is actuated by an external force operably controlled by a control arrangement.

18 Claims, 4 Drawing Sheets

(56) References Cited

U.S. PATENT DOCUMENTS

| | | |
|---|---|---|
| 2012/0031086 A1 | 2/2012 | Bell et al. |
| 2012/0312655 A1* | 12/2012 | Heubner ............ F16D 48/0206 |
| | | 192/48.601 |
| 2014/0265316 A1* | 9/2014 | Mullin .................... F16L 37/23 |
| | | 285/315 |
| 2015/0316185 A1* | 11/2015 | Mullin .................... F16L 35/00 |
| | | 285/315 |
| 2018/0172083 A1* | 6/2018 | Severinsson ........ F16D 25/0638 |
| 2018/0252348 A1* | 9/2018 | Robins ................. F15B 20/005 |

OTHER PUBLICATIONS

Third Party Observation for application No. EP21195548.9 submitted to the EPO on Jul. 28, 2022, 2 pages.

\* cited by examiner

ARRANGEMENT FOR RELEASING A COUPLING CONNECTION OF A HYDRAULIC QUICK COUPLER

RELATED APPLICATIONS

This application claims priority to German Patent Application No. 102020125415.6, filed Sep. 29, 2020, the disclosure of which is hereby expressly incorporated by reference in its entirety.

FIELD OF THE DISCLOSURE

The present disclosure relates to an arrangement for releasing a coupling connection of a hydraulic quick coupler having a hydraulic coupling for receiving a hydraulic plug, the hydraulic coupling having a coupler housing and a coupler cartridge which is displaceably mounted therein and which, when the hydraulic plug is pushed in, adopts an operating position locking the hydraulic coupling.

BACKGROUND

On agricultural tractors, hydraulic quick couplers are a constituent part of the hydraulic control devices (SCVs) provided in the rear region thereof, hydraulically operated units of agricultural working implements being able to be connected thereto. In this case, each of the hydraulic control devices is provided with a quick coupler pair, the two quick couplers thereof selectively forming a supply or return for hydraulic fluid. The hydraulically operated units which may be connected via associated hydraulic plugs or hoses to the hydraulic quick couplers serve in this case for performing various operating or working functions of the agricultural working implements. The agricultural working implements may be supported attachments, which are hitched to a three-point power lift of the agricultural tractor, or towed working implements. The towed working implements are attached by a mechanical hitch connection to the agricultural tractor, thus by a drawbar, which is hitched via a lockable ball coupling onto a coupling ball of the agricultural tractor. The towed working implements may be, inter alia, a loader wagon, a transport trailer or even various soil cultivation machines which are provided with hydraulically operated units such as rotary drives, hydraulic cylinders or harvested crop conveying devices.

The hydraulic quick couplers serve for producing a so-called push-pull connection when the respective hydraulic plug is pushed in. To this end, the coupler cartridge is mounted inside the coupler housing so as to be axially deflectable counter to a centering spring force from an operating position in a pushing-in direction ("push") or in a pulling-out direction ("pull") of the hydraulic plug. The coupler cartridge is thus axially displaceably received in the coupler housing corresponding to the pushing-in or pulling-out direction of the hydraulic plug. The coupler cartridge bears a ball cage, the balls thereof cooperating with an inner contour configured on the coupler housing, such that, in the operating position of the coupler cartridge, these balls engage in a blocking manner in a peripheral groove on the hydraulic plug but are released in a correspondingly moved-in transfer position or moved-out ejection position when the hydraulic plug is pushed in or pulled out by the displacement of the coupler cartridge from the operating position.

The manual force which has to be applied for pulling out the hydraulic plug is relatively high so that generally a manually actuatable ejection lever is provided on the coupler housing, a force acting in the pulling-out direction of the hydraulic plug being able to be exerted thereby on the coupler cartridge. Depending on the gear ratio of the ejection lever, the implementation of the pulling-out process may be assisted thereby to a greater or lesser extent.

The function of the above-described push-pull mechanism additionally ensures that the coupling connection is also released when a pulling force acting on the hydraulic plug or a hydraulic hose located thereon exceeds a specific amount. In this manner, a tear-off protection is implemented, with the loss of the mechanical hitch connection between the agricultural tractor and the towed working implement, the tear-off protection preventing damage being caused to the hydraulic hose due to overloading and as a result a release of hydraulic fluid. In order to ensure a defined release of the coupling connection, it is necessary that the pulling force runs as far as possible axially relative to the coupler cartridge. In practice, this is generally not the case, so that the triggering behavior varies unpredictably as a function of the position and orientation of the towed working implement relative to the agricultural tractor, thus in unfavorable conditions a reliable or timely release of the coupling connection is not ensured.

There is a need to configure an arrangement such that a uniform or reproducible triggering behavior of the hydraulic quick coupler may be implemented.

SUMMARY

According to the present disclosure, an arrangement for releasing a coupling connection of a hydraulic quick coupler comprises a hydraulic coupling for receiving a hydraulic plug, the hydraulic coupling having a coupler housing and a coupler cartridge which is displaceably mounted therein and which, when the hydraulic plug is pushed in, adopts an operating position locking the hydraulic coupling. An actuating arrangement is also present, the coupler cartridge being able to be moved thereby from the operating position into an ejection position releasing the hydraulic plug, actuated by an external force instigated by a control arrangement.

Due to the actuation of the coupler cartridge by external force, it is possible to implement a triggering behavior of the hydraulic quick coupler which is independent of the pulling force and which is thus uniform or reproducible.

According to a first embodiment of the arrangement according to the present disclosure, the actuating arrangement comprises a control chamber which may be pressurized and in which the coupler cartridge is mounted such that the coupler cartridge may be urged into the ejection position by the build-up of pressure inside the control chamber. In this case, the control chamber may be structurally integrated in the coupler housing, the coupler cartridge forming a piston which is actuatable by pressure and which adjoins the control chamber. This leads to a particularly compact construction of the actuating arrangement. The build-up of pressure inside the control chamber is carried out hydraulically and typically is in the order of magnitude of 1 to 2 bar.

Particularly short triggering times may be achieved if, for the build-up of pressure, a membrane accumulator, which may be pretensioned by a pressure source, is able to be connected in a pressurized manner to the control chamber of the actuating arrangement via an activation valve which may be triggered by the control arrangement. The discharge of the membrane accumulator into the control chamber takes place in this case directly with the opening of the activation valve, so that an ejection of the hydraulic plug is ensured substantially without delay. In the case of less critical requirements for the triggering times, instead of the membrane accumulator, the use of an electrically driven pump is also conceivable for the purpose of the build-up of pressure. In this case, the activation valve may be dispensed with.

Moreover, it is possible that first and second lines lead into the control chamber, the first line as a supply being able to be connected in a pressurized manner to the membrane accumulator via a throttle valve and the activation valve, and the second line as a return being able to be connected in a pressurized manner to a hydraulic reservoir via an outlet valve. For the build-up of pressure inside the control chamber, on the one hand, the supply formed by the first line is released by opening the activation valve and, on the other hand, the return formed by the second line is blocked by closing the outlet valve. The throttle valve serves in this case for the targeted limitation of the pressure gradients formed in the control chamber when the activation valve is opened, thus of the kinetic energy which is present when the hydraulic plug is ejected.

In this case, the outlet valve may be actuated by a differential pressure which prevails at the throttle valve when the activation valve is triggered, such that the return formed by the second line is closed in the direction of the hydraulic reservoir. In such a case, the outlet valve is configured to be actuatable by pressure, a particularly simple construction of the actuating arrangement being produced by using the differential pressure which prevails via the throttle valve as a control variable.

According to a second embodiment of the arrangement according to the present disclosure, it is also conceivable that the coupler cartridge may be urged into the ejection position by an electrical actuator encompassed by the actuating arrangement. The electrical actuator may have a pole rod which is connected to the coupler cartridge and which deflects the coupler cartridge in the direction of the ejection position by a corresponding application of current to a magnetic coil coaxially surrounding the pole rod.

In order to provide active assistance to the operator for producing the coupling connection, there is also the possibility that the actuating arrangement has a further electrical actuator, the coupler cartridge being able to be urged thereby into a transfer position which has to be overcome when the hydraulic plug is pushed in. To this end, the further electrical actuator comprises a further magnetic coil which in turn coaxially surrounds the pole rod and deflects this pole rod together with the coupler cartridge in the direction of the transfer position by a corresponding application of current, reducing the insertion force having to be applied. The activation of the further electrical actuator is carried out, for example, by the control arrangement when a user instruction expressed via an input element is identified. The input element is, for example, a push button arranged in the region of associated control devices of an agricultural tractor, the actuating signals thereof being supplied to a monitoring unit for activating the further electrical actuator.

Relative to the meaning of the operating position, ejection position and transfer position of the coupler cartridge which is displaceably mounted inside the coupler housing, reference should be made to the function of the push-pull mechanism described in the introduction in order to avoid repetition.

For implementing a tear-off protection, the control arrangement may activate the actuating arrangement in accordance with a triggering command indicating an imminent mechanical overload of the coupling connection. In this case, the activation is carried out in an automated manner, so that it is ensured that a connected hydraulic hose is reliably protected from excessive pulling forces.

In order to provide additional protection to the hydraulic hose, an imminent tearing-off is already detected as far as possible before the occurrence of the pulling forces associated therewith. In the case of a coupling connection produced between an agricultural tractor and a towed working implement, it is possible that the triggering command is generated by the control arrangement as a function of a coupling state, detected by sensor, of a mechanical hitch connection between the agricultural tractor and the towed working implement.

Depending on the design of the actuating arrangement, the triggering command may be generated in different ways by using mechanical, electromechanical or electronic components of the control arrangement.

If the actuating arrangement corresponding to the first embodiment of the arrangement according to the present disclosure is an activation valve, the purely mechanical triggering thereof by a pull cable, which runs between the agricultural tractor and the towed working implement, is conceivable. The pull cable in this case is fixedly mounted with one of its ends on the towed working implement, wherein the free end thereof is hooked onto an actuator on the agricultural tractor provided for triggering the activation valve. Alternatively, the control arrangement may also comprise a combination of a pull cable and a switch which may be actuated thereby, of a contactless distance sensor for identifying when a distance is exceeded between the agricultural tractor and the towed working implement, in the form of a radar sensor or ultrasonic sensor, a camera or the like. In this case, the information provided by the switch or the distance sensors is evaluated by a monitoring unit encompassed by the control arrangement and, depending on the embodiment of the arrangement according to the present disclosure, converted into a triggering command suitable for triggering the activation valve or activating the electrical actuator. In this case, the activation valve may be triggered by a magnetic coil which may be electrically actuated by the monitoring unit.

The arrangement according to the present disclosure, apart from the implementation of an improved tear-off protection, may also be used to provide active assistance to an operator when releasing the coupling connection. To this end, the actuating arrangement may also be manually activated on the instructions of the operator. In this case, the activation may be carried out when a user instruction expressed via an input element is identified, a corresponding triggering command being able to be generated thereby independently of the intervention of the tear-off protection. The input element is, for example, a push button arranged in the region of associated control devices, the actuating signals thereof being supplied to the monitoring unit for generating the triggering command to be transmitted to the actuating arrangement. In this case, the use of an ejection lever, as is provided in conventional quick couplers, is superfluous.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
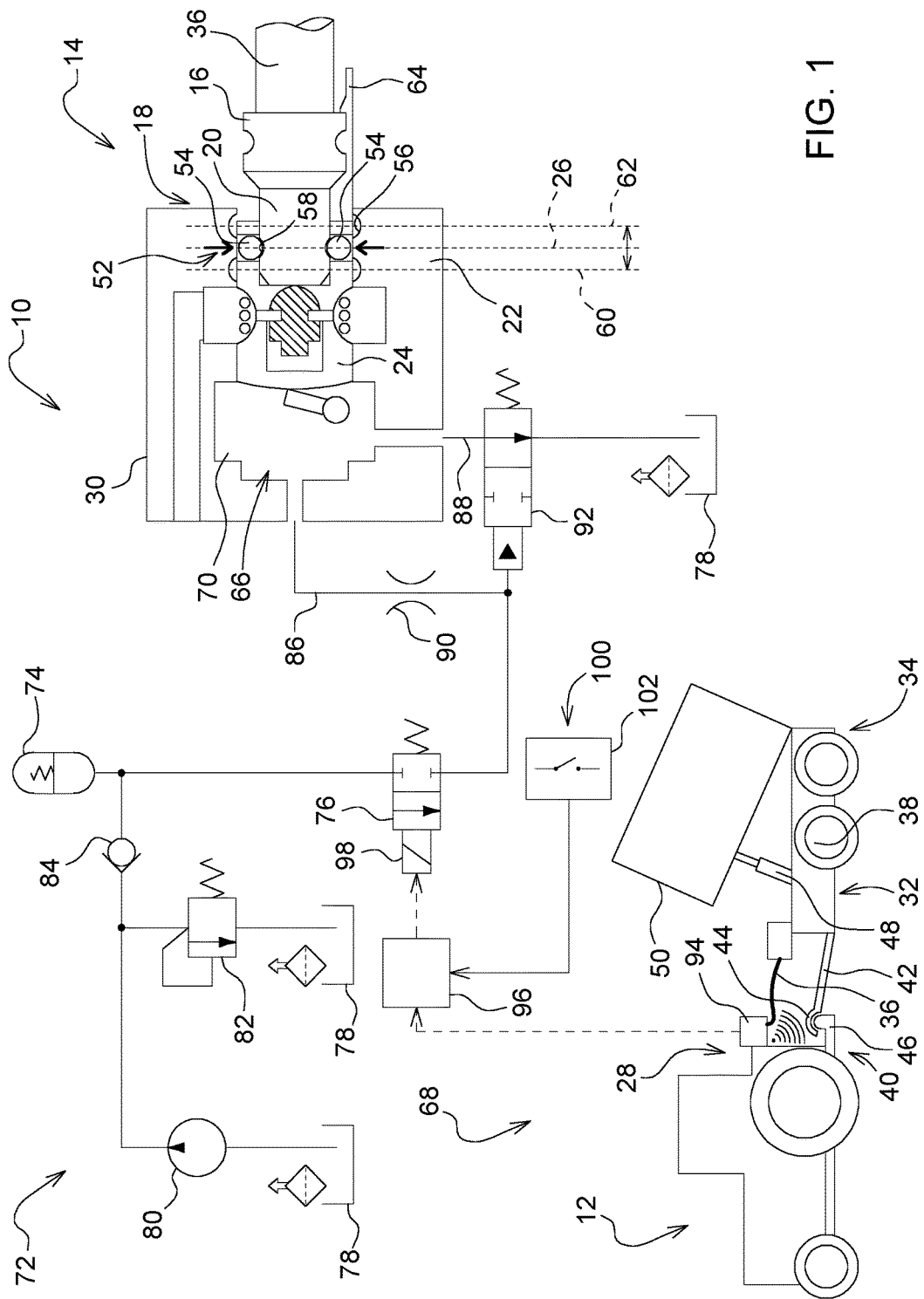
FIG. 1 is a schematic view of the arrangement according to the present disclosure provided with a tear-off protection corresponding to a first embodiment.

FIG. 1 shows a schematic view of the arrangement according to the present disclosure corresponding to a first embodiment. In the present case, the arrangement 10 is a constituent part of an agricultural tractor 12 and comprises a hydraulic quick coupler 14 which serves for producing a coupling connection to a hydraulic plug 16. To this end, the quick coupler 14 has a hydraulic coupling 18 for receiving the hydraulic plug 16 in the region of a coupling portion 20. The hydraulic coupling 18 comprises a coupler housing 22 and a coupler cartridge 24 which is displaceably mounted therein and which, when the hydraulic plug 16 is pushed in, adopts an operating position 26 locking the hydraulic coupling 18.

The hydraulic quick coupler 14 is a constituent part of a hydraulic control device 30 provided in the rear region 28 of the agricultural tractor 12. A hydraulically operated unit 32 of an agricultural working implement 34 is connected to the hydraulic control device 30 by the hydraulic plug 16 or a hydraulic hose 36 located thereon, in order to perform an associated operating or working function of the agricultural working implement 34.

Contrary to the view in FIG. 1, the hydraulic control device 30 is provided with a quick coupler pair, the two quick couplers thereof selectively forming a supply or return for hydraulic fluid. Since the function of the arrangement 10 is identical for each of the quick couplers, this is to be described hereinafter with reference to the individual quick coupler 14.

For example, the agricultural working implement 34 is a towed working implement in the form of a loader wagon 38. The loader wagon 38 is attached by a mechanical hitch connection 40 to the agricultural tractor 12, in the present case by a drawbar 42 which is hitched to a coupling ball 46 of the agricultural tractor 12 via a lockable ball coupling 44. The hydraulically operated unit 32 which is configured as a hydraulic cylinder 48 serves for tilting a loading surface 50 of the loader wagon 38. In addition to the hydraulic cylinder 48, further hydraulically operated units are present, such as a rotary drive for the driven wheels of the loader wagon 38 or a harvested crop conveying device for collecting stalk-like cut crops. These hydraulically operated units are connected to further hydraulic control valves or quick couplers of the agricultural tractor 12. These hydraulically operated units are also constituent parts of the arrangement 10 but are not shown in FIG. 1 for reasons of clarity.

The hydraulic quick coupler 14 serves for producing a so-called push-pull connection when the hydraulic plug 16 is pushed in. To this end, the coupler cartridge 24 is mounted inside the coupler housing 22 so as to be axially deflectable counter to a centering spring force from the operating position 26 in the pushing-in direction ("push") or in the pulling-out direction ("pull") of the hydraulic plug 16. The coupler cartridge 24 is thus received in an axially displaceable manner inside the coupler housing 22 corresponding to the insertion direction or pulling-out direction of the hydraulic plug 16. The coupler cartridge 24 bears a ball cage 52, the balls 54 thereof cooperating with an inner contour 56 configured on the coupler housing 22, such that, in the operating position 26 of the coupler cartridge 24, these balls engage in a blocking manner in a peripheral groove 58 on the hydraulic plug 16 but are released in a correspondingly moved-in transfer position 60 or moved-out ejection position 62 when the hydraulic plug 16 is pushed in or pulled out by the displacement of the coupler cartridge 24 from the operating position 26.

Since the manual force to be applied for pulling out the hydraulic plug 16 is relatively high, a manually actuatable ejection lever 64 is provided on the coupler housing 22, a force acting in the pulling-out direction of the hydraulic plug 16 being able to be exerted thereby on the coupler cartridge 24. Depending on the gear ratio of the ejection lever 64, the implementation of the pulling-out process may be assisted thereby to a greater or lesser extent.

Moreover, the arrangement 10 comprises an actuating arrangement 66, the coupler cartridge 24 being able to be moved thereby counter to the centering spring force from the operating position 26 into the ejection position 62 releasing the hydraulic plug 16, actuated by external force instigated by a control arrangement 68.

According to the first embodiment shown in FIG. 1 of the arrangement 10, the actuating arrangement 66 comprises a control chamber 70 which may be pressurized and in which the coupler cartridge 24 is mounted such that, by the build-up of pressure inside the control chamber 70, the coupler cartridge may be urged into the ejection position 62. The control chamber 70 is structurally integrated in the coupler housing 22, the coupler cartridge 24 forming a piston which is actuatable by pressure and which adjoins the control chamber 70. The build-up of pressure inside the control chamber 70 takes place hydraulically and is typically in the order of magnitude of 1 to 2 bar.

For the build-up of pressure, a membrane accumulator 74 which is pretensionable by a pressure source 72 may be connected in a pressurized manner to the control chamber 70 of the actuating arrangement 66 via an activation valve 76 which may be triggered by the control arrangement 68. The pressure source 72 is, for example, a pump 80 fed by hydraulic fluid from a hydraulic reservoir 78 of the agricultural tractor 12. A pressure control valve 82 leading into the hydraulic reservoir 78 ensures that a predetermined maximum pressure is maintained during the pretensioning or filling of the membrane accumulator 74. A check valve 84 prevents a return flow of hydraulic fluid when the pump 80 is switched off.

First and second lines 86, 88 lead into the control chamber 70, the first line 86 as a supply being able to be connected in a pressurized manner to the membrane accumulator 74 via a throttle valve 90 and the activation valve 76, and the second line 88 as a return being able to be connected in a pressurized manner to the hydraulic reservoir 78 via an outlet valve 92 which is actuatable by pressure. The throttle valve 90 serves for the targeted limitation of the pressure gradients formed in the control chamber 70 when the activation valve 76 is opened, thus of the kinetic energy which is present when the hydraulic plug 16 is ejected.

A tear-off protection is implemented by the control arrangement 68. The control arrangement 68 comprises contactless distance sensors 94 for identifying when a distance is exceeded between the agricultural tractor 12 and loader wagon 38. If such a distance is exceeded, a loss of the mechanical hitch connection 40 may be assumed.

In the present case, the distance sensors 94 are configured as ultrasonic sensors. Alternatively, however, the sensors may also be radar sensors, cameras, or the like. The information provided by the distance sensors 94 is evaluated by a monitoring unit 96, which is encompassed by the control arrangement 68, and is converted into a triggering command suitable for triggering the activation valve 76. A magnetic coil 98 which may be actuated electrically by the monitoring unit 96 is provided for activating the activation valve 76. Generally speaking, the triggering command is generated by the control arrangement 68 as a function of a coupling state, which is detected by sensor, of the mechanical hitch connection 40 between the agricultural tractor 12 and the loader wagon 38.

Figure 2:
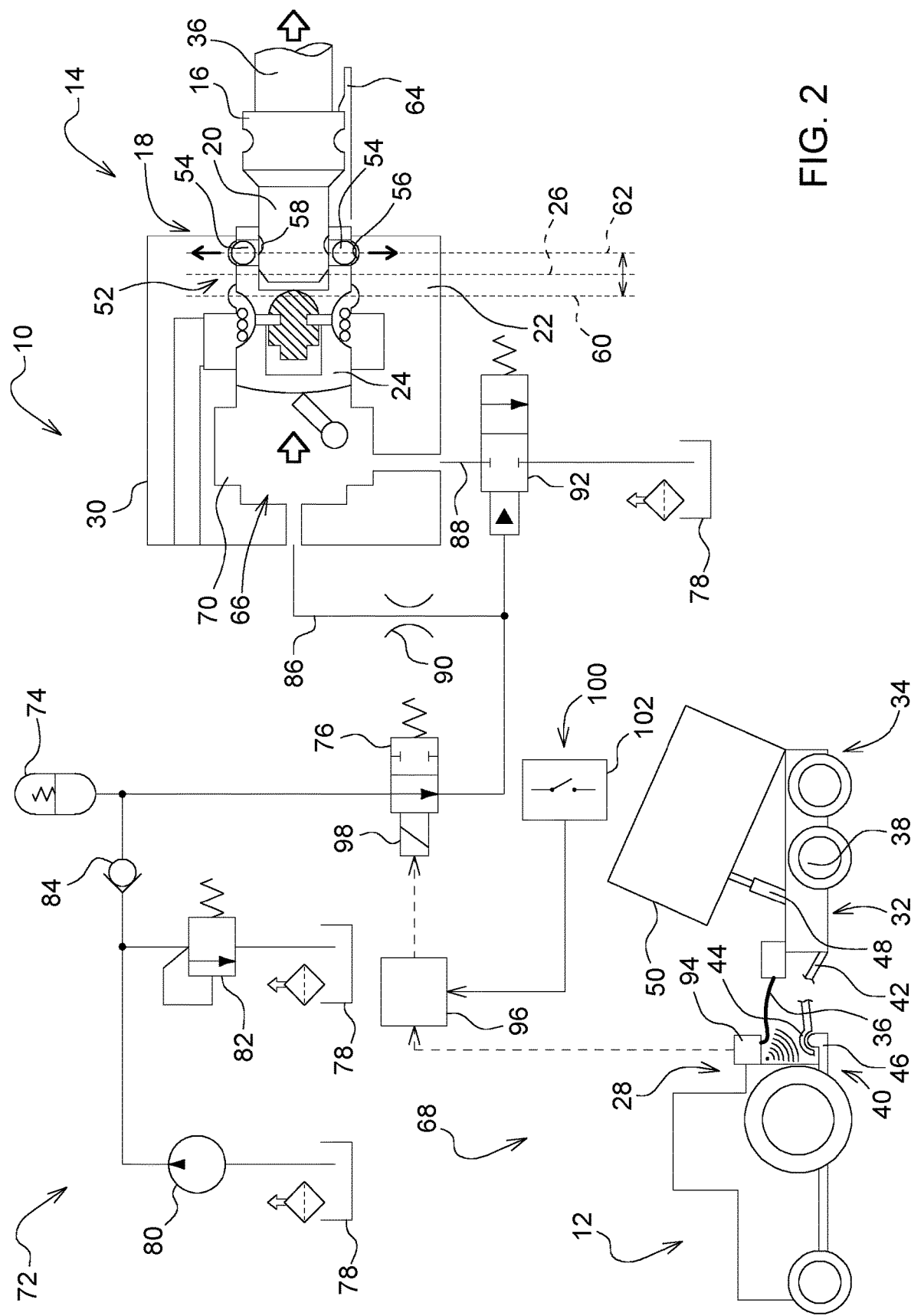
FIG. 2 shows the arrangement of FIG. 1 when the tear-off protection is triggered.

Such a situation may be seen in FIG. 2 in which the arrangement 10 illustrated in FIG. 1 is shown when the tear-off protection is triggered. If, due to the information provided by the distance sensors 94, a loss of the mechanical hitch connection 40 is concluded, the monitoring unit 96 opens the activation valve 76 by actuating the magnetic coil 98 in order to open up the pressure connection from the membrane accumulator 74 in the direction of the throttle valve 90 and the outlet valve 92 which is actuatable by pressure. Due to the flow resistance of the throttle valve 90, a differential pressure prevails at the throttle valve, the differential pressure being of such a size that the outlet valve 92 is closed. Thus, for the build-up of pressure inside the control chamber 70, on the one hand, the supply formed by the first line 86 is opened up by opening the activation valve 76 and, on the other hand, the return formed by the second line 88 is blocked by closing the outlet valve 92.

The discharge of the membrane accumulator 74 into the control chamber 70 is carried out directly with the opening of the activation valve 76, such that an ejection of the hydraulic plug 16 substantially without delay and thus a reliable protection of the hydraulic hose 36 connected to the quick coupler 14 from excess pulling forces is ensured.

The arrangement 10, apart from the implementation of an improved tear-off protection, may also be used to provide active assistance to an operator when releasing the coupling connection. To this end, the actuating arrangement 66 may also be manually activated on the instructions of the operator. The activation takes place in this case when a user instruction expressed via a first input element 100 is identified, a triggering command provided for triggering the activation valve 76 being able to be initiated thereby independently of the intervention of the tear-off protection. The first input element 100 is a first push button 102 arranged in the region of the control device 30, the actuating signals thereof being supplied to the monitoring unit 96 for generating the triggering command to be transmitted to the actuating arrangement 66. In this case, the use of an ejection lever as provided in conventional quick couplers is superfluous.

Figure 3:
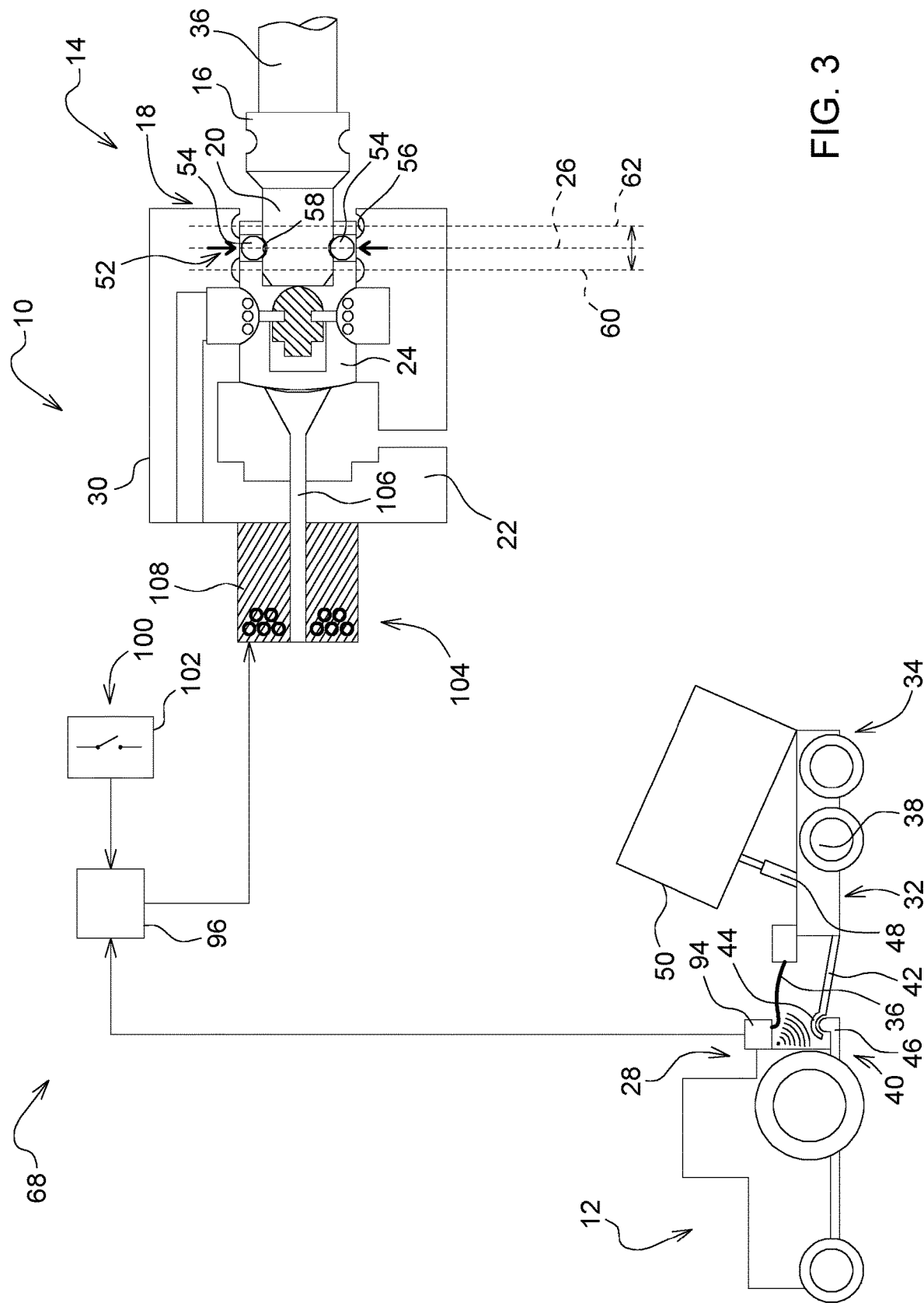
FIG. 3 is a schematic view of the arrangement according to the present disclosure provided with a tear-off protection corresponding to a second embodiment.

FIG. 3 shows a schematic view of the arrangement according to the present disclosure corresponding to a second embodiment. Accordingly, for implementing the tear-off protection, the actuating arrangement 66 comprises an electrical actuator 104 which may be activated by the monitoring unit 96, the coupler cartridge 24 being able to be urged thereby into the ejection position 62. The electrical actuator 104 has a pole rod 106 which is connected to the coupler cartridge 24 and which by a corresponding application of current to a magnetic coil 108 coaxially surrounding the pole rod 106 deflects the coupler cartridge 24 in the direction of the ejection position 62. The electrical actuator 104 is activated by the monitoring unit 96 in accordance with the triggering command generated by the control arrangement 68.

Figure 4:
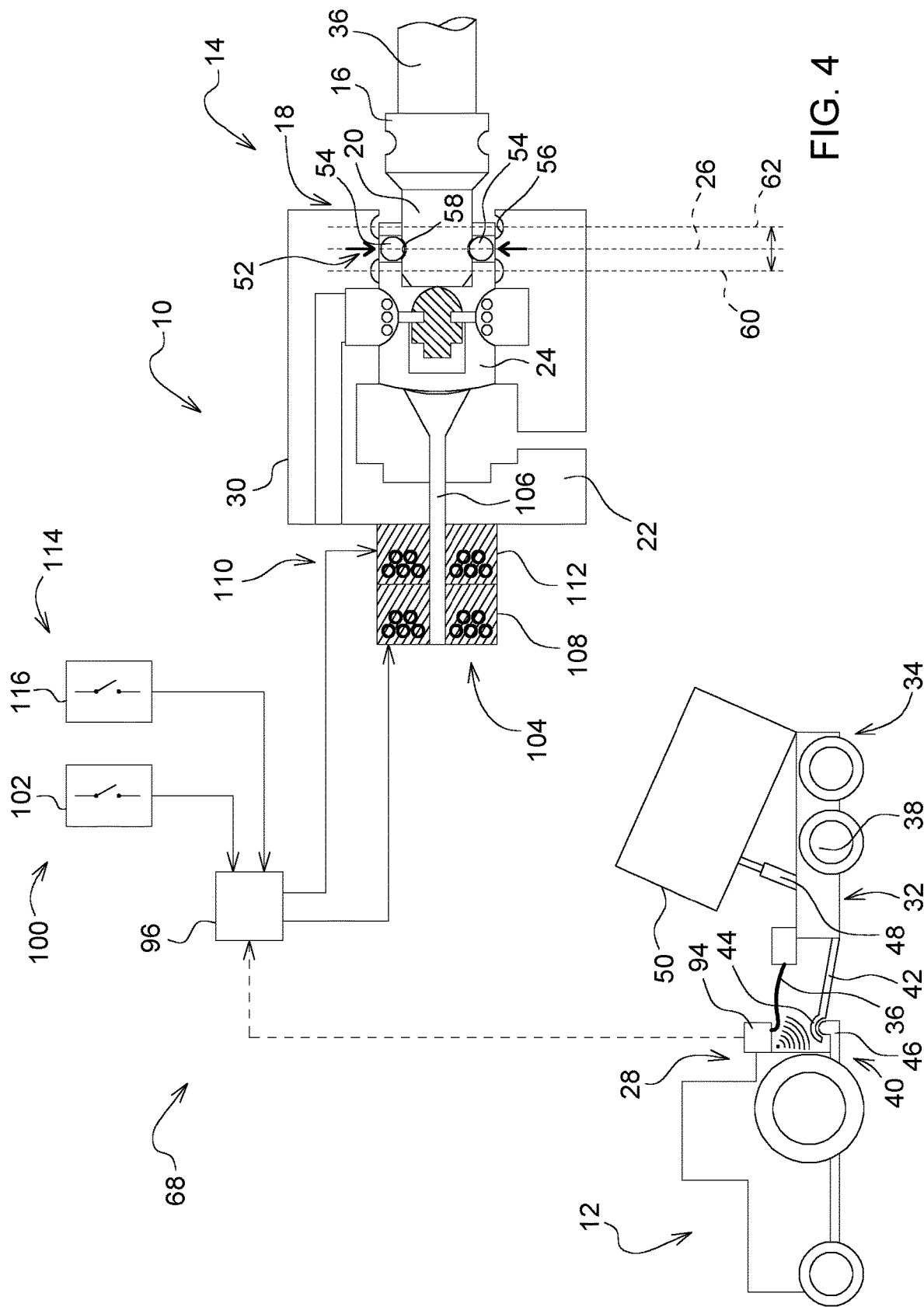
FIG. 4 shows a variant of the second embodiment of the arrangement shown in FIG. 3.

According to FIG. 4, corresponding to a variant of the second embodiment of the arrangement 10 shown in FIG. 3, in order to provide active assistance to the operator when producing the coupling connection, it is provided that the actuating arrangement 66 has a further electrical actuator 110, the coupler cartridge 24 being able to be urged thereby into the transfer position 60 which has to be overcome when the hydraulic plug 16 is pushed in. To this end, the further electrical actuator 110 comprises a further magnetic coil 112 which in turn coaxially surrounds the pole rod 106 and by a corresponding application of current deflects this pole rod together with the coupler cartridge 24 in the direction of the transfer position 60, reducing the insertion force which has to be applied. The further electrical actuator 110 is activated by the monitoring unit 96 when a user instruction expressed via a second input element 114 is identified. The second input element 114 is a second push button 116 arranged in the region of the control device 30, the actuating signals thereof being supplied to the monitoring unit 96 for activating the further electrical actuator 110.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. An arrangement for releasing a coupling connection of a hydraulic quick coupler, comprising:
   a hydraulic coupling for receiving a hydraulic plug, the hydraulic coupling including a coupler housing and a coupler cartridge displaceably mounted therein such that when the hydraulic plug is pushed in, the coupler cartridge adopts an operating position locking the hydraulic coupling;
   a control chamber configured to be pressurized and to actuate the coupler cartridge by pressurization; and
   a controller configured to control the pressure in the control chamber;
   wherein the coupler cartridge is movable with respect to the control chamber from the operating position to an ejection position for releasing the hydraulic plug.

2. The arrangement as claimed in claim 1, wherein the coupler cartridge is mounted in the control chamber, the coupler cartridge being urged into the ejection position by the build-up of pressure inside the control chamber.

3. The arrangement as claimed in claim 2, wherein for the build-up of pressure, a membrane accumulator is connected in a pressurized manner to the control chamber via an activation valve which is triggered by the controller.

4. The arrangement as claimed in claim 3, wherein the membrane accumulator is pretensioned by a pressure source.

5. The arrangement as claimed in claim 3, wherein first and second lines lead into the control chamber, the first line including a supply being connected in a pressurized manner to the membrane accumulator via a throttle valve and the activation valve, and the second line including a return being connected in a pressurized manner to a hydraulic reservoir via an outlet valve.

6. The arrangement as claimed in claim 5, wherein the outlet valve is actuated by a differential pressure at the throttle valve when the activation valve is triggered, the return formed by the second line being closed in the direction of the hydraulic reservoir.

7. The arrangement as claimed in claim 1, wherein the coupler cartridge is manually activated.

8. An arrangement for releasing a coupling connection of a hydraulic quick coupler, comprising:
   a hydraulic coupling for receiving a hydraulic plug, the hydraulic coupling including a coupler housing and a coupler cartridge displaceably mounted therein such that when the hydraulic plug is pushed in, the coupler cartridge adopts an operating position locking the hydraulic coupling, wherein the coupler cartridge is movable from the operating position to an ejection position for releasing the hydraulic plug; and
   a controller configured to instigate an external force for actuating the coupler cartridge in accordance with a triggering command indicating an imminent mechanical overload of the coupling connection.

9. The arrangement as claimed in claim 8, wherein the triggering command is generated by the controller as a function of a coupling state of a mechanical hitch connection between an agricultural tractor and a towed working implement.

10. The arrangement as claimed in claim 9, wherein the coupling state is detected by a sensor.

11. An arrangement for releasing a coupling connection of a hydraulic quick coupler, comprising:
   a hydraulic coupling for receiving a hydraulic plug, the hydraulic coupling including a coupler housing and a coupler cartridge displaceably mounted therein such that when the hydraulic plug is pushed in, the coupler cartridge adopts an operating position locking the hydraulic coupling; and
   a controller configured to instigate an external force for actuating the coupler cartridge;
   wherein the coupler cartridge is movable from the operating position to an ejection position for releasing the hydraulic plug;
   wherein for a build-up of pressure, a membrane accumulator is pretensioned by a pressure source and connected in a pressurized manner to a control chamber of via an activation valve which is triggered by the controller;
   wherein first and second lines lead into the control chamber, the first line including a supply being connected in a pressurized manner to the membrane accumulator via a throttle valve and the activation valve, and the second line including a return being connected in a pressurized manner to a hydraulic reservoir via an outlet valve.

12. The arrangement as claimed in claim 11, wherein the coupler cartridge is mounted in the control chamber, the coupler cartridge being urged into the ejection position by the build-up of pressure inside the control chamber.

13. The arrangement as claimed in claim 11, wherein the controller is configured to activate the coupler cartridge in accordance with a triggering command indicating an imminent mechanical overload of the coupling connection.

14. The arrangement as claimed in claim 13, wherein the triggering command is generated by the controller as a function of a coupling state of a mechanical hitch connection between an agricultural tractor and a towed working implement, the coupling state being detected by a sensor.

15. An arrangement for releasing a coupling connection of a hydraulic quick coupler, comprising:
   a hydraulic coupling for receiving a hydraulic plug, the hydraulic coupling including a coupler housing and a coupler cartridge displaceably mounted therein such that when the hydraulic plug is pushed in, the coupler cartridge adopts an operating position locking the hydraulic coupling;
   at least one electrical actuator, the coupler cartridge being urged thereby into a transfer position which is overcome when the hydraulic plug is pushed in; and
   a controller configured to instigate an external force for actuating the coupler cartridge in accordance with a triggering command indicating an imminent mechanical overload of the coupling connection;
   wherein the coupler cartridge is movable via the electrical actuator from the operating position to an ejection position for releasing the hydraulic plug.

16. The arrangement as claimed in claim 15, further comprising:
   a further electrical actuator, the coupler cartridge being urged thereby into a transfer position which is overcome when the hydraulic plug is pushed in.

17. The arrangement as claimed in claim 15, wherein the triggering command is generated by the controller as a function of a coupling state of a mechanical hitch connection between an agricultural tractor and a towed working implement.

18. The arrangement as claimed in claim 17, wherein the coupling state is detected by a sensor.

* * * * *